Nov. 24, 1953

R. C. JOHNSON, JR 2,660,452

IMPLEMENT CARRIER FRAME

Filed Jan. 8, 1952

INVENTOR
ROBERT C. JOHNSON, JR.

BY
*Semmes, Keegin, Robinson & Semmes*
ATTORNEYS

Nov. 24, 1953    R. C. JOHNSON, JR    2,660,452
IMPLEMENT CARRIER FRAME
Filed Jan. 8, 1952    2 Sheets-Sheet 2

INVENTOR
ROBERT C. JOHNSON, JR.

BY
*Semmes, Keegin, Robinson & Semmes*
ATTORNEYS

Patented Nov. 24, 1953

2,660,452

UNITED STATES PATENT OFFICE 2,660,452

IMPLEMENT CARRIER FRAME

Robert C. Johnson, Jr., Lubbock, Tex.

Application January 8, 1952, Serial No. 265,391

6 Claims. (Cl. 280—150)

This invention relates to implement carrier frame, and more particularly relates to an adjustable implement carrier frame for tractors whereby a cotton harvester or other implement may be mounted on a motor vehicle, such as a tractor, for operation and use.

It is quite usual to mount agricultural implements or machines on tractors by means of suitable carrying and mounting members which are attached to and supported by the tractor. However, different makes and different models of tractors vary from each other in size and in the sizes of their various parts; and heretofore the machine or implement mounting and carrying attachment means that have been provided have been of such design that they fit and can be used with only one particular size of tractor or one particular size of tractor part to which its members are attached. Accordingly, different implement carrier frames have been required for the different makes and types of tractors.

It is a principal object of this invention to provide an implement carrier frame for supporting a harvester or other machine or implement on a tractor, the frame being adjustable to fit and to be attached to tractors of different sizes and types, thus eliminating the necessity of providing separate and different implement carrier frames for the different sizes and types of tractors.

Another object of this invention is to provide an adjustable carrier frame of the character described, and a carrier frame which is suited to mount and support different kinds of machines or implements on a tractor.

Another object of this invention is to provide a carrier frame of the character described and which is strong, sturdy and durable, provides a very firm, tight and strong attachment to the tractor and affords a strong, steady and firm support for the machine or implement that is mounted thereon.

Another object of this invention is to provide a carrier frame of the character described and which may be adjusted quickly and easily to be attachable to different sizes of tractor parts to which the attachment is to be made; and can be attached to and mounted on or dismounted from a tractor readily and easily.

A specific object of this invention is to provide an adjustable carrier frame of the character described and which is attachable to tractor axle housings of different cross-sectional dimensions and shapes.

Other objects of this invention will be in part obvious and in part pointed out hereinafter.

In accordance with this invention the adjustable implement carrier frame includes a pair of sturdy and strong clamps clampable tightly and firmly respectively on opposite tractor axle housings of different cross-sectional dimensions and shapes, as occurs in different sizes and models of tractors, so that the carrier frame can be used with tractors of different makes and models among which the cross-sectional dimensions and shapes of the axle housings differ. Supported on and pivotally secured to each of these clamps is an under girder arm extending rearwardly from the clamp, the swinging connection of the girder arms to the clamps permitting the arms to be adjusted toward and from each other to accommodate therebetween tractor transmissions of different widths, as occur in tractors of different sizes, makes and models. A pair of supporting bars extend across and are supported on the two under girder arms, one toward the rear ends of the girder arms and the other spaced forwardly from the rear supporting bar, and means are provided on the under girder arms and the supporting bars whereby these arms and bars may be fastened together in the adjusted positions of the girder arms on their pivots relatively to each other and in different positions into which the supporting bars have been adjusted on the girder arms longitudinally thereof. The supporting arms are adapted to have mounted thereon and to support a cotton harvester or other machine which preferably has a base or framework that may be placed on the supporting arms; conventional means being employed to anchor the harvester or other machine to the supporting bars of the mounting. By adjusting the supporting bars on the girder arms toward or away from the power take-off shaft of the tractor the driving sprocket or pulley of the attached mechanism or implement can be aligned with the sprocket or pulley of the power take-off of the tractor for connection thereto.

The invention accordingly consists in the features of construction, combinations of elements and arrangement of parts which will be pointed out more fully hereinafter and the scope of the application of which will be set forth in the claims that follow.

In order that a clearer understanding of this invention may be had, attention is hereby directed to the accompanying drawings forming a part of this application and illustrating certain possible embodiments of this invention and in which.

Similar reference characters refer to similar parts throughout the several views of the drawings.

Figure 1:
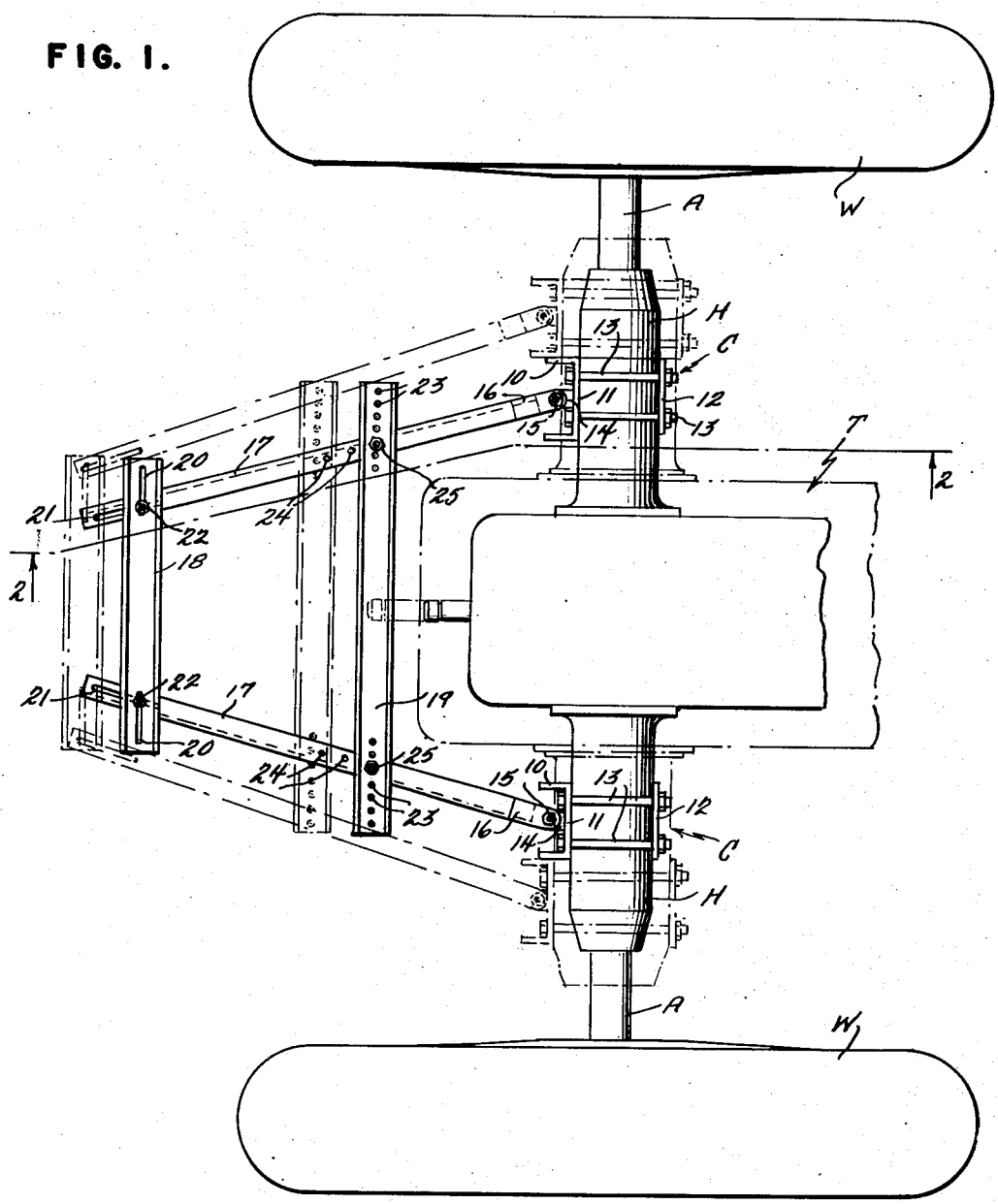
Figure 1 is a plan view of an adjustable implement carrier frame embodying this invention shown mounted on a tractor, only a part of the tractor being shown, and showing in solid lines the carrier frame attached to a tractor of one size and showing in dash lines the carrier frame in a different adjustment and mounted on a tractor of a larger size.
Figure 2:
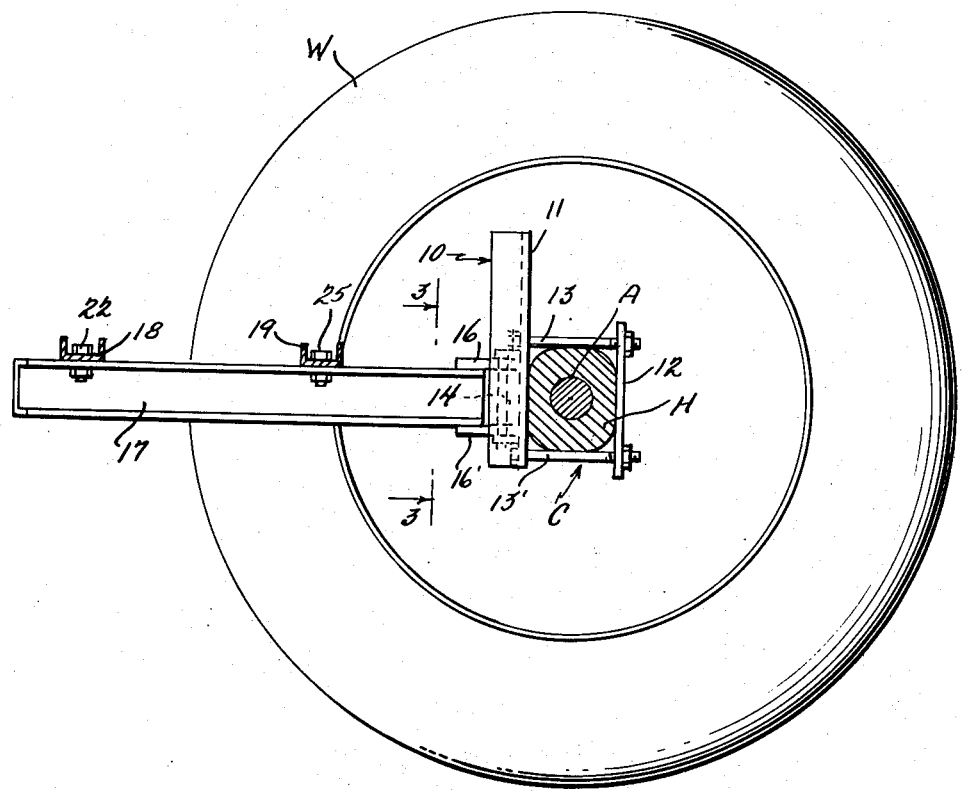
Figure 2 is a sectional view thereof and is taken on the line 2—2 of Figure 1.
Figure 3:
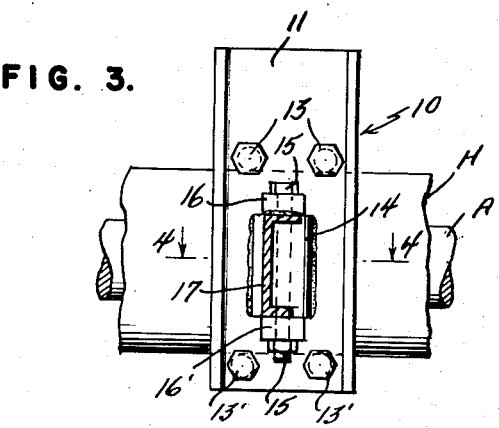
Figure 3 is a sectional view of a detail of the construction and is taken on the line 3—3 of Figure 2.
Figure 4:
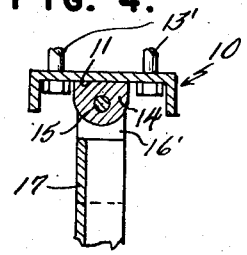
Figure 4 is a sectional view thereof and is taken on the line 4—4 of Figure 3.

The parts of the tractor included in the drawings include a part of the tractor transmission T, the oppositely extending axle housings H and axles A and wheels W.

The adjustable implement carrier frame includes a pair of clamps C adapted to be rigidly and firmly clamped about the two axle housings H of the tractor. Each clamp as shown includes an upright channel plate 10 with its base 11 adapted to seat against one side of the axle housing H, and a clamping plate 12 adapted to seat against the opposite side of the axle housing H. The channel member and the plate 12 are adapted to be clamped tightly and firmly on the axle housing H by means of bolts 13 which extend between the channel 10 and plate 12 above the axle housing and bolts 13' which extend between the channel 10 and the plate 12 below the axle housing. It is readily apparent that these clamping means may be applied to axle housings of different cross sectional dimensions as well as to axle housings of different cross sectional shapes such as round, square and hexagonal. To the base 11 of each channel member 10 is secured as by welding a journal block 14 which has a vertical hole to receive a bolt 15 pivotally therein; the upper and lower ends of the bolt extending through bolt holes provided therefor in upper and lower ears 16 and 16' carried on the rear end of a channel shaped girder arm 17 which has its web or base in vertical position.

On these two girder arms 17 are supported two cross-supporting bars 18 and 19 which extend across the two girder arms 17 and are adjustable on the girder arms longitudinally thereof, and are adapted to be secured thereto in their adjusted positions. The cross-supporting bar 18 is disposed toward the rear ends of the girder arms 17 and the cross-supporting bar 19 is spaced same distance inwardly from the bar 18. To permit adjustment of the bar 18 on the arms 17, the bar 18 adjacent its ends is provided with elongated slots 20 and each arm 17 is provided in its upper flange and near its end with a slot 21. The bar 18 is adapted to be rigidly secured to the two arms 17 by means of bolts 22 which penetrate the slots 20 of the bar 18 and the slots 21 of the arms 17 as clearly shown in Figure 1. This means of adjustably connecting the bar 18 to the arms 17 not only permits the adjustment of the arms 17 relatively to each other but also permits adjustment of the bar 18 longitudinally on the arms 17.

The adjustable attachment means between the bar 19 and the arms 17 may comprise a series of bolt holes 23 in the bar 19 toward each end thereof and a series of bolt holes 24 in the arms 17. The bar 19 is adapted to be securely and firmly attached to the arms 17 by means of bolts 25 which extend through aligned bolt holes in the bar 19 and the arms 17. Thus the attachment of the bar 19 to the arms 17 can be made when the arms 17 are in different adjustments relatively to each other and also in different adjustments of the bar 19 longitudinally on the arms 17.

In Figure 1 there is shown in full lines the carrier frame as it may appear when clamped to a tractor having one size of axle housings and transmission and showing in dot and dash lines the carrier frame as it may appear when adjusted to and mounted on a tractor having axle housings of larger cross sectional dimensions and a larger transmission.

In attaching the carrier frame to a tractor the clamps are clamped on to the opposite axle housings, the girder arms 17 are adjusted to accommodate the tractor transmission there-between and the bars 18 and 19 are then fastened to the arms 17 in such adjusted location thereto relatively to the power take-off shaft of the tractor that the sprocket or pulley of the power take-off of the tractor aligns with the sprocket or pulley which drives the mechanism of the attached harvester or other implement when mounted on the bars 18 and 19. Thus not only can the carrier frame be accommodated to tractors of different makes, sizes and models but also the carrier frame is suited to supporting and carrying different types of machines and implements. Also it is seen that an adjustable implement carrier frame constructed in accordance with this invention comprises few parts, is simple and sturdy in construction and serves to mount and support a machine or implement in a very firm, sturdy, and proper manner.

As many changes could be made in the above construction and as many different embodiments of this invention may be made without departing from the scope thereof, it is to be understood that all matter contained in the above description or shown in the accompanying drawings be interpreted as illustrative and not in a limiting sense.

What I claim is:

1. A carrier frame of the character described, including, in combination, a pair of clamps adapted to be clamped in spaced relation on a tractor or other vehicle, a girder arm extending horizontally from each clamp and pivoted at an end to the clamp on a vertical pivot whereby said arms may be adjusted toward and from each other, machine supporting means extending between and carried on both said arms, and securing means engageable with said means and said arms and adapted to fasten said supporting means to said arms at various different places along the length of said arms in accordance with various different adjusted positions of said arms relatively to each other.

2. A carrier frame as set forth in claim 1 and in which said supporting means are adjustable longitudinally on said arms and said securing means are adapted to fasten the supporting means to said arms in various different longitudinally adjusted positions of said supporting means on said arms.

3. A carrier frame as set forth in claim 1 and in which said supporting means include a plurality of bars extending between and carried on both of said arms.

4. A carrier frame as set forth in claim 3 and in which each of said arms has an elongated bolt slot and one of said bars has two elongated bolt slots adjacent opposite ends of the bar and registering respectively with the bolt slots of the two arms.

5. A carrier frame as set forth in claim 4 and in which each of said arms has also a series of bolt holes therealong and another of said bars has a series of bolt holes therealong toward opposite ends thereof, the bolt holes toward one end of said last mentioned bar being adapted to be placed selectively in registry with any one of said bolt holes in one of said arms and the bolt holes toward the opposite end of said last mentioned bar being adapted to be placed selectively in registry with any one of said bolt holes in the other of said arms.

6. A carrier frame of the character described, including, in combination, clamping means including a channel plate, a clamping plate and means engaging said plates and adapted to clamp said plates tightly against opposite sides of a tractor axle housing, a block on the channel plate, a girder arm having upper and lower ears extending longitudinally from one end of the arm and seating respectively above and below said block, and a pivot bolt extending through said ears and block, pivotally supporting said girder arm on said clamping means.

ROBERT C. JOHNSON, Jr.

References Cited in the file of this patent

UNITED STATES PATENTS

| Number | Name | Date |
| --- | --- | --- |
| 498,015 | Luebben | May 23, 1893 |
| 1,865,365 | Foote | June 28, 1932 |
| 2,204,824 | Rock | June 18, 1940 |

FOREIGN PATENTS

| Number | Country | Date |
| --- | --- | --- |
| 404,658 | France | Oct. 25, 1909 |